United States Patent [19]

Veaux et al.

[11] Patent Number: 5,207,398
[45] Date of Patent: May 4, 1993

[54] DEVICE FOR LOCKING A SUPPORT FOR STEERABLE WHEELS

[75] Inventors: Jacques Veaux, Chatillon; Michel Derrien, Versailles, both of France

[73] Assignee: Messier-Bugatti, 78140 Velizy Villacoublay, France

[21] Appl. No.: 785,815

[22] Filed: Oct. 31, 1991

[30] Foreign Application Priority Data

Nov. 30, 1990 [FR] France ................................ 90 15079

[51] Int. Cl.⁵ .......................................... B64C 25/00
[52] U.S. Cl. ................................ 244/100 R; 16/35 R; 244/103 R; 280/114
[58] Field of Search ........... 244/100 R, 102 R, 102 A, 244/103 R, 50; 280/112.2, 772, 689, 86, 113, 114; 16/35 R

[56] References Cited

U.S. PATENT DOCUMENTS

| | | | |
|---|---|---|---|
| 2,656,050 | 10/1953 | Best et al. | 16/35 R |
| 2,657,938 | 11/1953 | Browne et al. | 16/35 R |
| 2,851,231 | 9/1958 | Westcott, Jr. | 244/102 R |
| 2,943,820 | 7/1960 | Westcott, Jr. | 244/103 R |
| 3,643,898 | 2/1972 | Whitener et al. | 244/50 |
| 3,845,919 | 11/1974 | Jenny | 244/103 R |
| 4,309,791 | 1/1982 | Aulik | 16/35 R |

FOREIGN PATENT DOCUMENTS

| | | | |
|---|---|---|---|
| 877405 | 12/1942 | France | 16/35 R |
| 1018918 | 1/1953 | France . | |
| 1391911 | 2/1965 | France . | |
| 1544174 | 10/1968 | France | 244/103 R |
| 179049 | 4/1962 | Sweden | 244/103 R |
| 375999 | 4/1964 | Switzerland | 280/114 |
| 630183 | 10/1949 | United Kingdom | 244/103 R |

Primary Examiner—Joseph F. Peters, Jr.
Assistant Examiner—Anne E. Bidwell
Attorney, Agent, or Firm—Sixbey, Friedman, Leedom & Ferguson

[57] ABSTRACT

The locking device of the invention comprises a locking device mounted to pivot relative to a beam and having ends associated with an axle to lock the axle in a first position of the locking device and to release the axle by the locking device pivoting towards a second position, together with a control actuator and a set of two links for controlling the position of the locking device.

9 Claims, 2 Drawing Sheets

DEVICE FOR LOCKING A SUPPORT FOR STEERABLE WHEELS

The present invention relates to a device for locking a support for steerable wheels.

BACKGROUND OF THE INVENTION

Because of the increasing size of aircraft, it is necessary to use an increasing number of wheels on their main landing gear in order to distribute the load of the aircraft better. In addition, in order to enable the aircraft to take up a sufficiently nose-high attitude without excessively increasing the length of the struts of the landing gear, it is becoming more and more common practice to use landing gear including a beam mounted to tilt at the rear end of the landing gear strut, with the wheels of the landing gear being distributed along the tilting beam.

When the number of wheels is increased, it becomes necessary to increase the length of the tilting beam. However the direction of the beam is fixed and parallel to the longitudinal axis of the aircraft, such that when taxiing on the ground, and in particular when turning corners on the ground, the wheels are subjected to large side forces. To minimize these side forces, proposals have been made to mount at least one of the sets of wheels on a swivelling axle which is steered simultaneously with the steering of the auxiliary landing gear used for steering the aircraft while it is running on the ground. Under such circumstances, it is nevertheless necessary to lock the swivelling axle in order to ensure that it takes up a satisfactory direction during take-off and landing of the aircraft, or even when taxiing at speed, e.g. above 30 km/h.

The present invention thus relates to a locking device for locking a swivelling axle mounted on a beam.

SUMMARY OF THE INVENTION

The present invention provides such a device comprising locking means mounted to pivot relative to the beam and having ends associated with the axle to lock the axle when the locking means are in a first position and to release the axle by pivoting the locking means towards a second position, together with control means for controlling the position of the locking means.

In a first embodiment, the locking means comprise two hinged assemblies disposed on either side of the beam, each hinged assembly comprising a lever hinged to a telescopic connecting rod, one end of each hinged assembly being hinged to the beam, and an opposite end being hinged to the axle, and the control means are disposed to fix the direction of the levers relative to the telescopic connecting rods, the telescopic connecting rod being in a fully compressed position when the locking means are in the first position. Preferably, when in the first position, the levers are substantially in alignment with the telescopic connecting rods.

In another embodiment of the invention, the locking means comprise a locking plate mounted to pivot relative to the beam and having its ends coming into contact with abutment surfaces carried by the axle when the locking plate is in the first position. Preferably, the abutment surfaces are inclined relative to a pivot axis of the locking plate to facilitate disengagement of the locking plate in the unlocking direction.

In both embodiments, the control means preferably include a set of two links that are hinged to each other and an actuator for controlling the position of the hinged links, with the stroke of the links being preferably limited either by an abutment for the links or by an abutment for the hinged assemblies.

BRIEF DESCRIPTION OF THE DRAWING

Embodiments of the invention are described by way of example with reference to the accompanying drawing, in which.

DETAILED DESCRIPTION

With reference to the figures, the locking device of the invention is intended to lock an axle 1 having sets of wheels (not shown) mounted thereon, with the axle being locked relative to one end of a tilting beam 2 fixed to the bottom end of landing gear.

Figure 1:
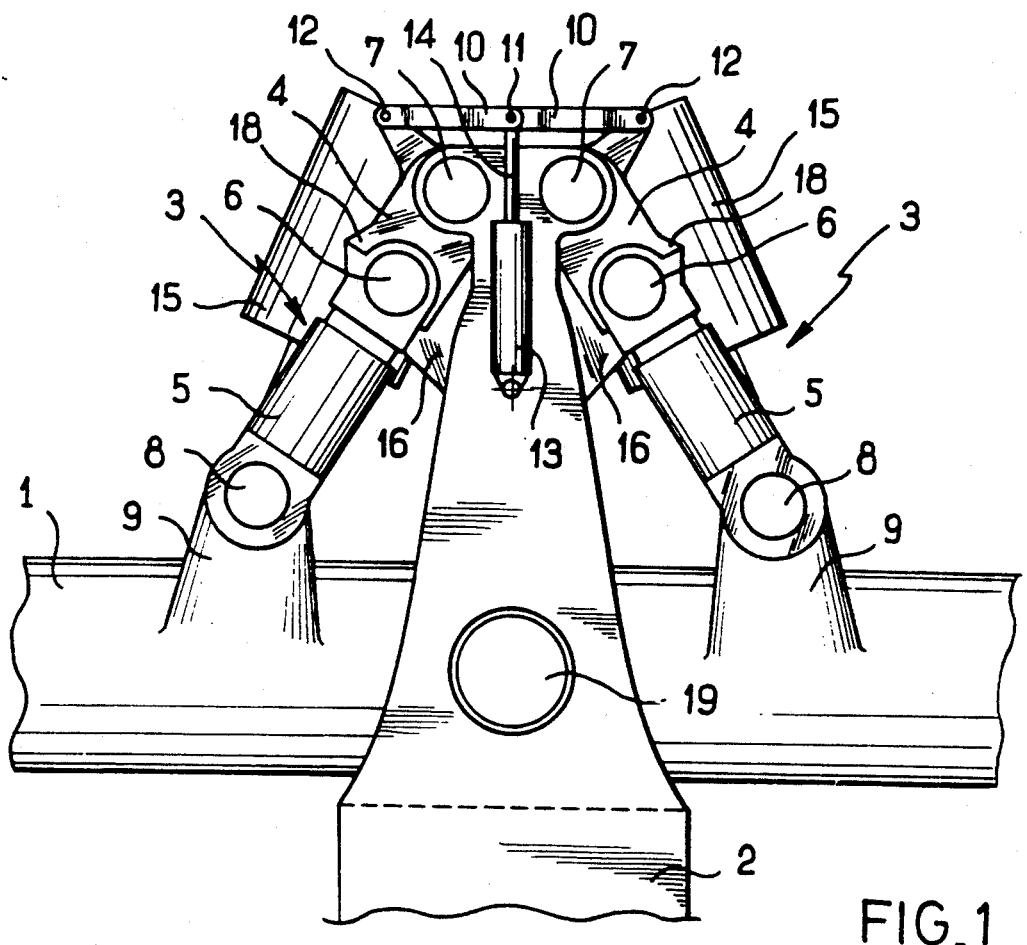
FIG. 1 is a plan view of a first locking device of the invention shown in its locked position.
Figure 2:
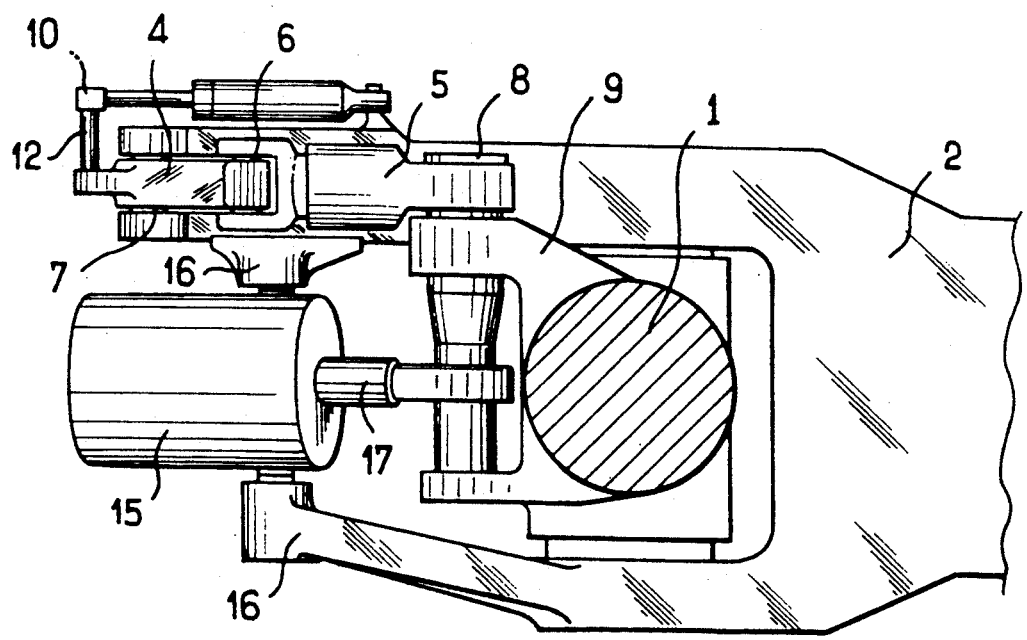
FIG. 2 is a fragmentary side elevation view of a landing gear equipped with the device shown in FIG. 1.
Figure 3:
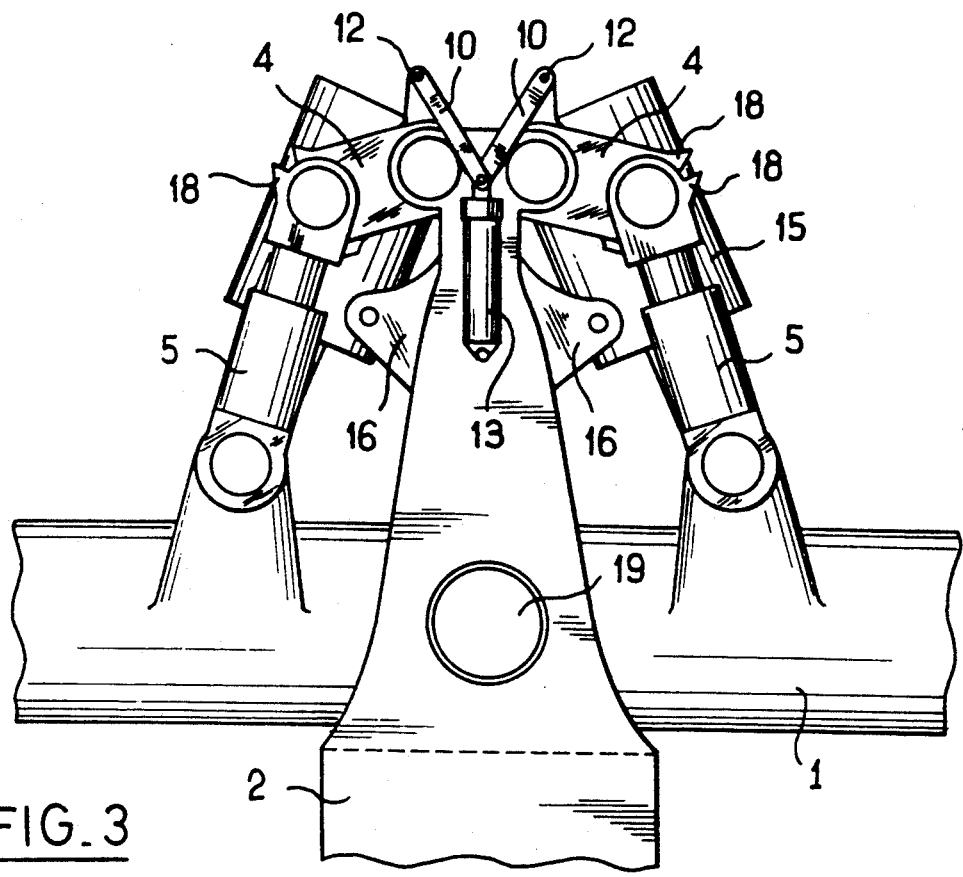
FIG. 3 is a plan view analogous to FIG. 1 but showing the device in its unlocked position.

In the first embodiment shown in FIGS. 1 to 3, the locking device includes two hinged assemblies generally referenced 3 disposed on either side of the beam 2 and each including a lever 4 and a telescopic connecting rod 5. Each lever 4 is hinged to the corresponding telescopic connecting rod 5 about a hinge axis 6. The end of each lever 4 distant from the hinge axis 6 is hinged to the beam 2 about a respective hinge axis 7. The opposite end of each hinged assembly 3 is hinged to the axle 1 about a respective hinge axis 8 carried by a corresponding projection 9 on the axle 1. The relative position of the levers 4 and of the telescopic connecting rods 5 is controlled by a set of two links 10 hinged to each other at their ends about a hinge axis 11. The opposite ends of the links 10 to the hinge axis 11 are hinged to respective ones of the levers 4 about hinge axes 12 which are offset from the hinge axes 7 of the levers relative to the beam 2. A control actuator 13 is fixed on the beam 2, and the end of the rod 14 of said control actuator is hinged to the hinge axis 11 common to the two links 10.

In addition, in the embodiment shown, the direction in which the axle 1 extends is controlled by steering actuators 15 mounted to pivot on projections 16 integral with the beam 2 and including respective actuator rods 17 whose ends are hinged to the hinge axes 8 carried by the axle 1.

In the first embodiment shown in FIG. 1, the control actuator 13 is controlled to extend its actuator rod 14 so that the hinged assemblies 3 are pushed apart by the links 10 until abutments 18 carried by the levers 4 and by the telescopic connecting rods 5 come into contact. In this first position the levers 4 and the telescopic connecting rods 5 are preferably substantially in alignment. The telescopic connecting rods 5 are in a fully compressed position. In this position of the locking means, the axle 1 is held in a neutral position, i.e. perpendicular to the beam 2. If a force is exerted on the axle 1 to change the direction in which it extends, this force id transmitted by one of the telescopic connecting rods 5 and the associated lever 4 to the hinge axis 8 carried by the beam 2, but the direction in which the axle 1 extends does not change since it is locked in position by the telescopic connecting rods 5 being in abutment and by the levers 4 being locked in position relative to the telescopic connecting rods 5.

FIG. 3 shows the device in its unlocked position. In this position, the control actuator 13 is retracted, thereby moving the links 10 out of alignment and moving the hinge axes 12 associated with these links towards each other. Consequently, the levers 4 are pivoted and the telescopic connecting rods 5 are expanded to a middle position. In order to ensure that both hinged assemblies 3 pivot symmetrically even if one of them has a stiff point, it is preferable to provide an abutment for the levers 4 in their pivoted position as shown in FIG. 3. For example, the stroke of the levers 4 is limited by the projections carrying the hinge axes 12 bearing against the beam 2.

In this position, it will be understood that a force exerted on the axle 1, e.g. a force exerted by the steering actuators 15, gives rise to one of the telescopic connecting rods 5 retracting while the opposite telescopic connecting rod extends, thereby swivelling the axle 1 about its swivel axis 19. The swivelling motion of the axle 1 is limited by the stroke of the telescopic connecting rods 5 relative to their middle position. The actuator 13 is a double-acting actuator, or else it is a single acting actuator operating in the actuator-retraction direction, with return means then being provided to return the device to its locked position in the absence of feed. The return means may be constituted, for example, by a spring disposed inside the actuator to return the actuator to its extended position, or by springs having one end fixed to the beam 2 and opposite ends fixed to the levers 4 or to the connecting rods 10 to return them towards the first position.

Figure 4:
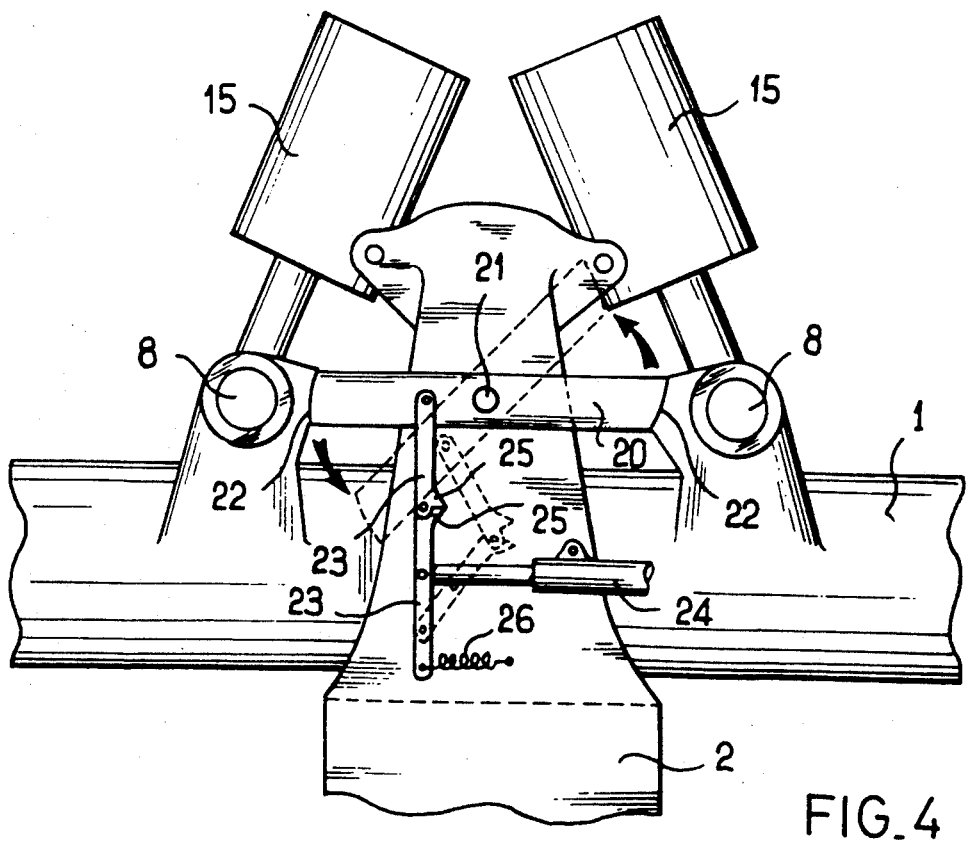
FIG. 4 is a plan view of a second embodiment of the invention.

FIG. 4 shows a second embodiment in which the locking device now comprises a locking plate 20 mounted to pivot on the beam 2 about a pivot axis 21. In a first position shown in solid lines in FIG. 4, the ends of the locking plate 20 are in contact with abutment surfaces 22 carried by the axle. As shown, it is preferable for the abutment surfaces 22 to be offset relative to the pivot axis 21 rather than being directed exactly towards it, thereby facilitating unlocking of the locking plate 20 on rotation thereof as illustrated by the arrows in FIG. 4. The means for controlling the position of the locking plate 20 comprise, as before, two links 23 which are hinged to each other, with one of the links 23 being hinged to the locking plate 20 and with the other link 23 being hinged to the beam 2. The relative position of the links 23 is determined by a control actuator 24 which is hinged to one of the control links 23. In the locked position shown in solid lines in FIG. 4, the locking plate 20 is kept in contact with the abutments 22 by the links 23 which include abutments 25 that are in contact with each other, the links 23 being preferably substantially in alignment. In the unlocked position as shown in dashed lines, the control actuator 24 is retracted, and the links 23 are at an angle to each other, thereby causing the locking plate 20 to pivot about the pivot axis 21. If the actuator 24 is a single-acting actuator, then a spring 26 is preferably provided between one of the links 23 and the beam 2 to return the links 23 towards a position where they are substantially in alignment.

It may be observed that both embodiments of the invention shown serve not only to lock the axle 1 when it is in its neutral position, but also to force it towards its neutral position when it is slightly offset therefrom.

Naturally the invention is not limited to the embodiments described, but may be varied in ways that will appear to the person skilled in the art.

In particular, although provision is made in the examples shown to bring the levers 4 into abutment against the telescopic connecting rods 5 by means of abutments 18, or to bring the links 23 into abutment against each other by means of abutments 25, the motion of these components may be limited in any way, e.g. by bringing them into abutment against a portion of the beam 2.

Similarly, once unlocked, the axle 1 may be steered by any appropriate means.

We claim:

1. A device for locking an axle mounted to swivel relative to a beam, wherein the device comprises locking means including two hinged assemblies disposed on either side of the beam, each hinged assembly comprising a lever hinged to a telescopic connecting rod, one end of each hinged assembly being hinged to the beam, and an opposite end being hinged to the axle, and control means disposed to fix the direction of the levers relative to the telescopic connecting rods, whereby the axle is locked when the telescopic connecting rod of each hinged assembly is in a fully compressed position.

2. A locking device according to claim 1, wherein in the first position the levers are substantially in alignment with the telescopic connecting rods.

3. A locking device according to claim 1, wherein the control means comprise a set of two links hinged to each other and each having one end hinged to one of the levers at a point thereof which is offset from the point where the lever is hinged relative to the beam, together with a control actuator for controlling the position of the links.

4. A locking device according to claim 3, wherein in the first position the locking means of the hinged assemblies are in abutment and the two control links are substantially in alignment with each other.

5. A device for locking an axle mounted to swivel relative to a beam, wherein the device comprises locking means including a locking plate mounted to pivot relative to the beam and having opposite ends facing respective abutment surfaces carried by the axle and control means for controlling the position of the locking plate.

6. A locking device according to claim 5, wherein the control means comprise a set of two links hinged to each other, one of the links having an end hinged to the locking plate and the other link having an end hinged to the beam, together with a control actuator for controlling the position of the links.

7. A locking device according to claim 5, wherein the abutment surfaces are inclined relative to a pivot axis of the locking plate to facilitate disengagement of the locking plate in the unlocking direction.

8. A locking device according to claim 7, wherein in the first position of the locking means, the control links are in abutment and are substantially in alignment with each other.

9. A device for locking an axle mounted to swivel relative to a beam, wherein the device comprises locking means mounted to pivot relative to the beam and having ends associated with the axle to lock the axle when the locking means are in a first position and to release the axle by pivoting the locking means towards a second position, together with control means for controlling the position of the locking means, wherein the locking means comprise two hinged assemblies disposed on either side of the beam, each hinged assembly comprising a lever hinged to a telescopic connecting rod, one end of each hinged assembly being hinged to the beam, and an opposite end being hinged to the axle, and the control means are disposed to fix the direction of the levers relative to the telescopic connecting rods, the telescopic connecting rod being in a fully compressed position when the locking means are in the first position.

* * * * *